(12) United States Patent
Huang et al.

(10) Patent No.: US 8,362,880 B2
(45) Date of Patent: Jan. 29, 2013

(54) METHOD AND COMPUTER PROGRAM PRODUCT FOR LOADING AND EXECUTING PROGRAM CODE AT MICRO-PROCESSOR

(75) Inventors: Chih-Hua Huang, Hsinchu Hsien (TW); Chih Yen Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 502 days.

(21) Appl. No.: 12/430,408

(22) Filed: Apr. 27, 2009

(65) Prior Publication Data

US 2009/0278667 A1 Nov. 12, 2009

(30) Foreign Application Priority Data

May 7, 2008 (TW) ................................ 97116752 A

(51) Int. Cl.
*H04Q 5/22* (2006.01)
*G06F 9/30* (2006.01)
*G06F 1/24* (2006.01)

(52) U.S. Cl. .................... 340/10.5; 340/572.4; 710/105; 712/206; 713/100

(58) Field of Classification Search ............... 340/572.4, 340/10.1–10.6; 709/230–237; 710/104–106; 711/105; 712/200–248; 717/168, 169, 173, 717/174, 175, 178; 713/100
See application file for complete search history.

(56) References Cited

U.S. PATENT DOCUMENTS

| | | | | |
|---|---|---|---|---|
| 4,888,773 A * | 12/1989 | Arlington et al. | ............. | 714/764 |
| 4,924,210 A * | 5/1990 | Matsui et al. | ............. | 340/10.41 |
| 5,787,101 A * | 7/1998 | Kelly | ............. | 714/800 |
| 5,952,935 A * | 9/1999 | Mejia et al. | ............. | 340/10.3 |
| 6,223,348 B1 * | 4/2001 | Hayes et al. | ............. | 725/152 |
| 6,226,665 B1 * | 5/2001 | Deo et al. | ............. | 718/106 |
| 6,661,438 B1 * | 12/2003 | Shiraishi et al. | ............. | 715/835 |
| 6,721,872 B1 * | 4/2004 | Dunlop et al. | ............. | 712/28 |
| 7,146,611 B1 * | 12/2006 | Phillips | ............. | 717/174 |
| 7,392,518 B1 * | 6/2008 | Chhabra et al. | ............. | 717/168 |
| 7,577,814 B1 * | 8/2009 | Yakovlev | ............. | 711/170 |
| 7,681,009 B2 * | 3/2010 | Adatrao et al. | ............. | 711/170 |
| 7,725,621 B2 * | 5/2010 | Mutaguchi | ............. | 710/22 |
| 7,999,658 B1 * | 8/2011 | Reynolds et al. | ............. | 340/10.2 |
| 8,266,692 B2 * | 9/2012 | Wenzinger et al. | ............. | 726/22 |
| 2002/0066792 A1 * | 6/2002 | Guthery et al. | ............. | 235/492 |
| 2004/0075642 A1 * | 4/2004 | Kisliakov | ............. | 345/156 |
| 2005/0132351 A1 * | 6/2005 | Randall et al. | ............. | 717/168 |

(Continued)

FOREIGN PATENT DOCUMENTS

CN 101103279 1/2008

OTHER PUBLICATIONS

State Intellectual Property Office of the People'S Republic of China, "Office Action", Apr. 1, 2011, China.

(Continued)

*Primary Examiner* — Benjamin C Lee
*Assistant Examiner* — Stephen Burgdorf
(74) *Attorney, Agent, or Firm* — WPAT PC; Justin King

(57) ABSTRACT

A method and apparatus for loading and executing program code at a micro-processor are disclosed. In this method, a monitoring procedure is performed to monitor whether the micro-processor receives a loading request corresponding to a target program code. If the loading request is received, the target program code is loaded from an external memory into an internal memory of the micro-processor. The micro-processor is then rebooted to enter a first mode in which the target program code in the internal memory is to be executed.

7 Claims, 3 Drawing Sheets

U.S. PATENT DOCUMENTS

| | | | |
|---|---|---|---|
| 2005/0198228 A1* | 9/2005 | Bajwa et al. | 709/220 |
| 2006/0041710 A1* | 2/2006 | Silva et al. | 711/102 |
| 2006/0052055 A1* | 3/2006 | Rowse et al. | 455/41.1 |
| 2006/0143606 A1* | 6/2006 | Smith et al. | 717/175 |
| 2006/0168388 A1* | 7/2006 | Von Tetzchner | 710/305 |
| 2006/0225060 A1* | 10/2006 | Goyan | 717/151 |
| 2007/0038990 A1* | 2/2007 | White et al. | 717/168 |
| 2007/0069862 A1* | 3/2007 | Mo et al. | 340/10.2 |
| 2008/0163201 A1* | 7/2008 | Jogand-Coulomb et al. | 717/178 |
| 2008/0208375 A1* | 8/2008 | Grgic et al. | 700/86 |
| 2008/0290995 A1* | 11/2008 | Bruns et al. | 340/10.1 |
| 2009/0089562 A1* | 4/2009 | Schuchman et al. | 712/228 |

OTHER PUBLICATIONS

Taiwan Patent Office Action issued on Jan. 13, 2012.

* cited by examiner

METHOD AND COMPUTER PROGRAM PRODUCT FOR LOADING AND EXECUTING PROGRAM CODE AT MICRO-PROCESSOR

FIELD OF THE INVENTION

The present invention relates to a micro-processor, and more particularly, to a method for loading and executing a program code at a micro-processor.

BACKGROUND OF THE INVENTION

Radio frequency identification (RFID) is a communication technology implementing a radio signal to identify a specific target and read/write related data. No physical or optical contact is needed between the specific target and a data reading system applying the RFID technology. As a result, data read/write speed of the data reading system is much faster than that of a traditional bar-code device.

An RFID tag is classified into active and passive types according to whether a chip is provided with an internal power supply. Taking a passive RFID tag as an example, an antenna of the RFID tag receives a radio signal transmitted from an RFID reader within a specific distance, and power needed by a chip circuit is provided by a received radio wave. Once started, the chip circuit of the RFID tag automatically decodes and interprets the signal received by the antenna, and provides information demanded by the RFID reader in the form of a radio signal, for example, an identification number of the tag, or an origin and a date of manufacture of goods to which the tag is attached.

Considering the RFID technology can be widely applied in fields of logistics management, public consumption, identification and smart homes and offices, the RFID reader integrated to portable electronics (such as mobile phones or PDAs) for improving convenience of various RFID applications has become an inevitable trend.

Nowadays as most portable electronics are faced with the restrictions of having low power consumption and low cost as well as being compact, further processes for combining more functions can be greater challenges. In other words, software and hardware resources of portable electronics are very limited and precious. As a result, how to combine RFID read/write functions under the condition of not occupying excessive software and hardware resources shall not be ignored.

However, RFID has a variety of standards and different specifications corresponding to different program codes; a general single-chip micro-processor is not likely to cover read/write functions of various RFID standards. An 8051 micro-processor, for example, is widely used and always applied as a core of an embedded system. Because an internal program memory is at most 64K bytes, an electronic product applying the 8051 micro-processor as an operation core of an RFID read/write module only holds a few kinds of RFID read/write program codes.

Therefore, holding various RFID read/write program codes in a single micro-processor is at the trade-off of applying a micro-processor with a larger memory capacity and a relatively higher price, or applying a plurality of micro-processors for different read/write standards, thereby greatly increasing cost of the electronic product.

SUMMARY OF THE INVENTION

In order to solve the foregoing problem, the present invention provides a highly flexible operation method of a micro-processor capable of supporting a plurality of RFID read/write programs.

An embodiment of the present invention is a method for loading and executing a target program code at a micro-processor. In the method, a monitoring procedure is first performed to monitor whether the micro-processor receives a loading request corresponding to the target program code. When the loading request is received, the target program code is loaded from an external memory into an internal memory of the micro-processor. The micro-processor is rebooted to enter a mode in which the target program code is to be executed.

An embodiment of the present invention is a communication device, comprising an external memory and a micro-processor. A target program code corresponding to a target communication protocol is stored in the external memory. The micro-processor comprises an internal memory. A monitoring procedure is performed to monitor whether the micro-processor receives a loading request corresponding to the target program code. When the loading request is received, the target program code is loaded from an external memory into an internal memory of the micro-processor. When the target program code is loaded into the internal memory, the micro-processor is rebooted and begins to execute the target program code in the internal memory.

Compared to the prior art, an operation method and a communication device according to the present invention implement a micro-processor having a single internal memory having a smaller storage capacity and thus lower cost, to support various RFID read/write programs. Following description and figures are disclosed to gain a better understanding of the advantages of the present invention.

DETAILED DESCRIPTION OF THE PREFERRED EMBODIMENT

Figure 1A:
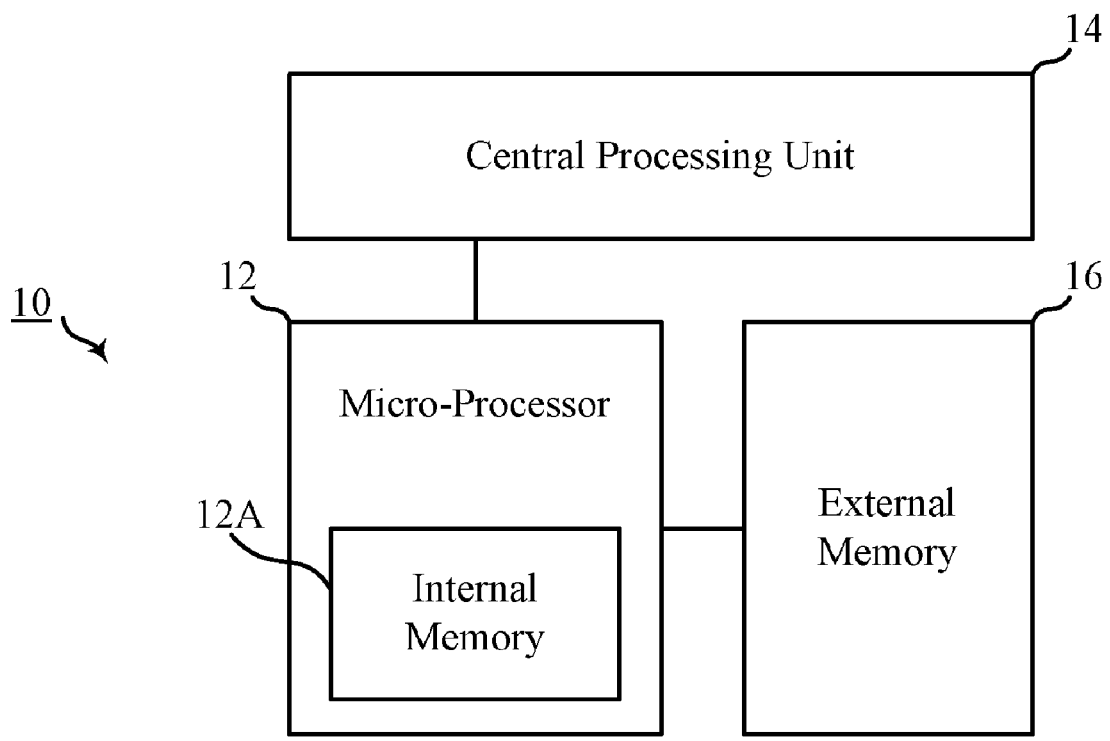
FIG. 1A is a block diagram of an electronic system according to an embodiment of the present invention.

An operation method for loading and executing program code at a micro-processor in accordance with an embodiment of the present invention is provided. In this embodiment, the micro-processor is configured in an electronic system, such as a mobile communication system. Referring to FIG. 1A, the electronic system 10 further comprises a central processing unit 14 and an external memory 16 in addition to the micro-processor 12 having an internal memory 12A. For example, the internal memory 12A is a static random access memory and the external memory 16 is a flash memory.

Figure 1B:
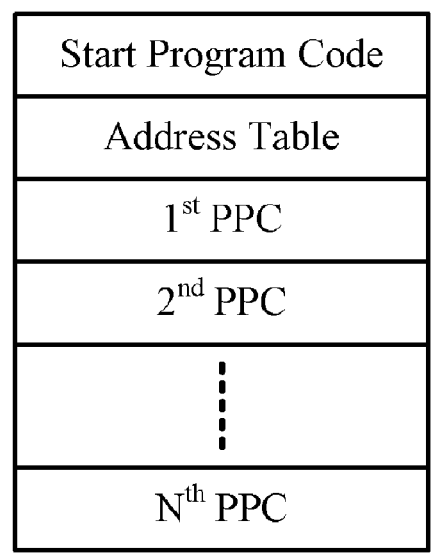
FIG. 1B is a block diagram of internal configuration of an external memory according to the present invention.

FIG. 1B is a block diagram of internal configuration of the external memory 16. A plurality of predetermined program codes respectively corresponding to different communication protocols is stored in the external memory 16 in advance. In this embodiment, N predetermined program codes, that is, from the first to the Nth predetermined program code, are stored in the external memory 16 and N is a positive integer greater than 1. For example, the predetermined program codes correspond to various RFID protocols, such as an ISO 14443A protocol, an ISO 15693 protocol, an ISO 18092 protocol or an EPC UHF C1G2 protocol.

A capacity of the internal memory 12A is decided by type and size of the micro-processor 12. In contrast, a capacity of the external memory 16 has the flexibility for large adjustments based on requirements of actual practice. More particularly, a capacity of the external memory 16 is decided by a designer of the electronic system, according to corresponding communication protocol and size of the program code of the electronic system 10.

Figure 2:
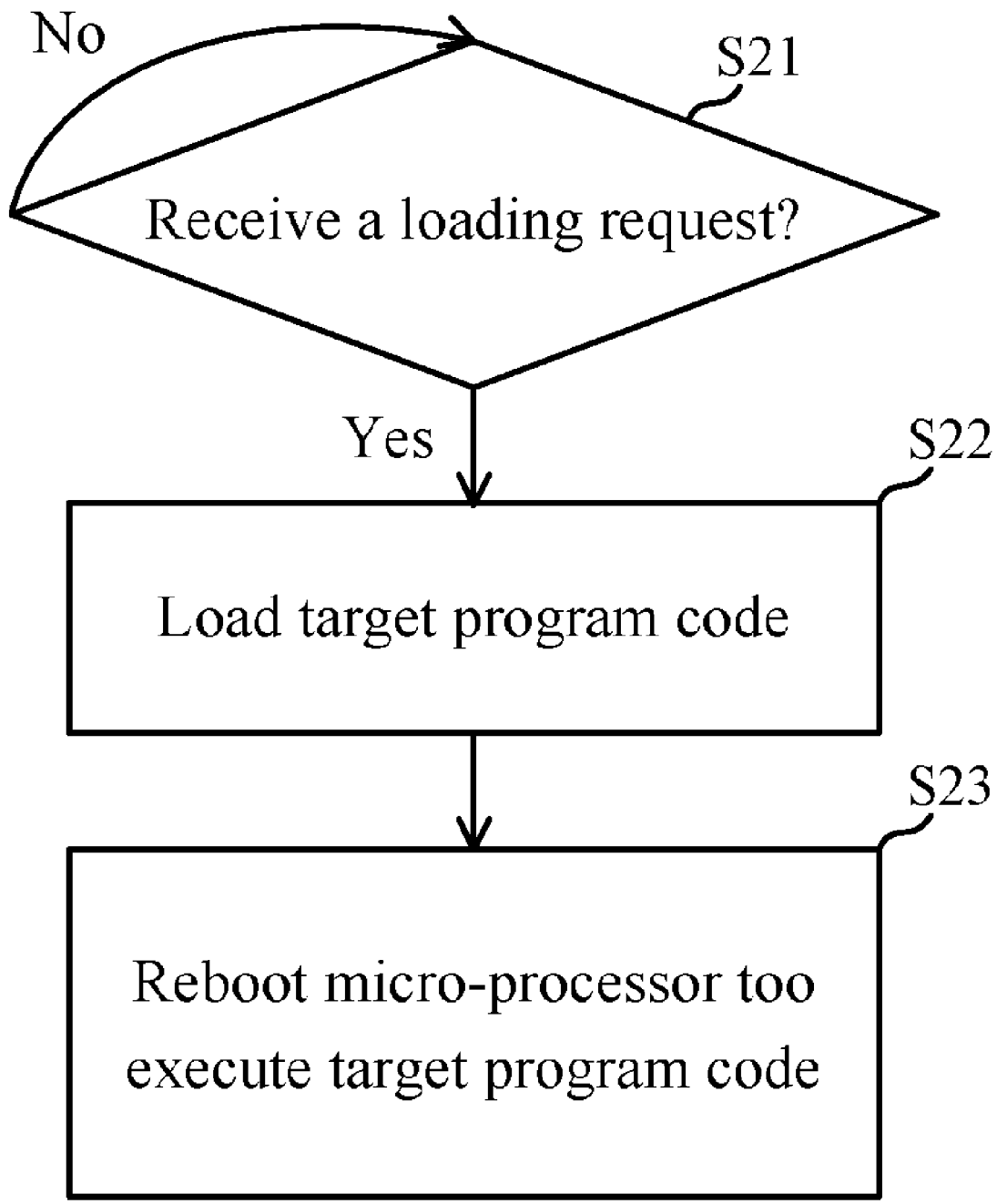
FIG. 2 is a flow chart of an operation method for loading and executing program code at a micro-processor according to an embodiment of the present invention.

Refer to FIG. 2 showing a flow chart of an operation method according to the present invention. In Step S21, a monitoring procedure is continuously or periodically performed to monitor whether the micro-processor 12 receives a loading request corresponding to a target program code. If the answer is no, Step S21 is repeated; if the answer is yes, Step S22 of loading the target program code from the external memory 16 into the internal memory 12A is executed. Sequentially, in Step S23, the micro-processor 12 is rebooted to enter a mode in which the target program code in the internal memory 12A will be executed.

For example, when the micro-processor 12 is requested to execute an RFID read/write function corresponding to the EPC UHF C1G2 protocol by the central processing unit 14, a loading request corresponding to the EPC UHF C1G2 protocol is transmitted from the central processing unit 14 to the micro-processor 12. When the micro-processor 12 receives the loading request, a predetermined program code, that is, the target program code, corresponding to the EPC UHF C1G2 protocol is loaded from the external memory 16 into the internal memory 12A.

After that, if the central processing unit 14 wishes the micro-processor 12 switches to execute the RFID read/write function corresponding to the ISO 14443A protocol, the central processing unit 14 transmits the loading request corresponding to the ISO 14443A protocol to the micro-processor 12. The predetermined program code corresponding to the ISO 14443A protocol is then loaded from the external memory 16 into the internal memory 12A.

According to the present invention, the program code stored in the internal memory 12A corresponding to the EPC UHF C1G2 protocol is erased before the internal memory 12A receives a new program code or directly overwritten by the new program code. As a result, the capacity of the internal memory 12A is large enough as long as one program code can be stored therein.

For example, if the microprocessor 12 and the external memory 16 have direct memory access (DMA) capabilities, the microprocessor 12 can load the program code mentioned above by way of DMA. As a result, the central processing unit 14 previously acting as an intermediate coordinator is no longer needed.

Refer to FIG. 1B showing the external memory 16 comprising a block for storing an address table, which is for listing a start address, length and a corresponding communication protocol of each predetermined program code in the external memory 16. Whereby, the micro-processor 12 is facilitated to look up a storage position of the target program code according to the communication protocol.

Figure 3:
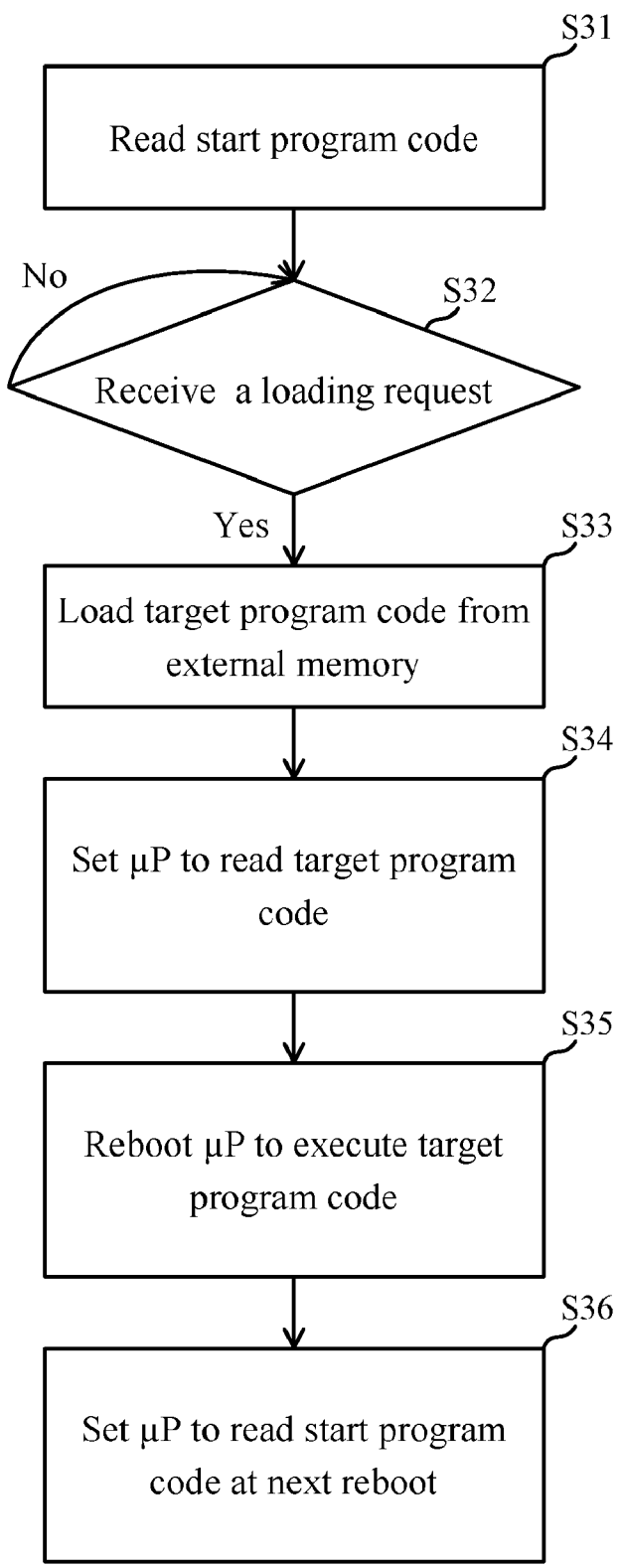
FIG. 3 is a flow chart of an operation method for loading and executing program code at a micro-processor according to another embodiment of the present invention.

Refer to FIG. 3 showing a flow chart of an operation method according to another embodiment of the present invention. In the embodiment, the external memory 16 comprises a block storing a start program code as shown in FIG. 1B. Moreover, program codes of the foregoing monitoring procedure and the loading procedure are comprised in the start program code.

In the embodiment, in Step S31, the start program code stored in the external memory 16 is read by the micro-processor 12 when started. Then, the monitoring procedure is automatically performed in Step S32. If a loading request corresponding to a target program code is received, the flow in accordance with the present invention proceeds to Step S33 to load the associated target program code from the external memory 16 into the internal memory 12A.

Referring to FIG. 3, after Step S33, the loading of the target program code into the internal memory 12A is completed; in Step S34, instead of the start program code stored in the external memory 16, the target program code stored in the internal memory 12A is set to be read by the micro-processor 12 when started again. In Step S35, the micro-processor 12 is thereafter rebooted to read and execute the target program code. In addition, in Step S36, the start program code stored in the external memory 16 is set to be read by the micro-processor 12 when started again. Thereby when the micro-processor is started next time, Step S31 and S32 are repeated to monitor whether the central processing unit 14 transmits a new loading request.

For example, the program code corresponding to Step S36 is comprised in each predetermined program code. In other words, regardless of which predetermined program code is loaded and executed by the micro-processor 12, the setting of starting the micro-processor 12 will be restored to a predetermined state.

According to another embodiment of the present invention, a computer program product stored in a computer-readable medium is provided. The computer-readable medium has an embedded computer program for loading and executing a target program code at a micro-processor. When the computer program code is executed by the micro-processor, steps shown in FIG. 2 or FIG. 3 are executed by the micro-processor.

According to another embodiment of the present invention, a mobile communication device is provided, such as all kinds of mobile phones or PDAs. The mobile communication device comprises the micro-processor 12, the central processing unit 14 and the external memory 16 as shown in FIG. 1A. The mobile communication device is capable of supporting various RFID read/write programs by use of the operation method provided in FIG. 2 or FIG. 3. More importantly, because the program codes corresponding to various RFID protocols are stored in the external memory 16, a capacity of the internal memory 12A of the micro-processor 12 need not be large.

In view of foregoing issues, when compared to the prior art, the operation method and the communication device according to the present invention can support various RFID programs by use of a single internal memory with a compact size and thus a lower cost. In other words, without greatly increasing the overall cost, the electronic device in accordance with the present invention provides more versatile RFID read/write capabilities compared to the prior art.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for loading and executing a target program code at a mobile communication device comprising a micro-processor, comprising steps of:
   (a) entering a monitoring mode from a non-monitoring mode and performing a monitoring procedure for monitoring whether the micro-processor receives a loading request corresponding to the target program code;

(b) loading the target program code from an external memory into an internal memory of the micro-processor in response to the loading request;

(c) rebooting the micro-processor to prompt the micro-processor to exit the monitoring mode and enter the non-monitoring mode in which the target program code in the internal memory is to be executed; and (d) after Step (c), setting the micro-processor to enter the monitoring mode in which the monitoring procedure is performed after the micro-processor is next rebooted; and wherein the target program code is one of a plurality of predetermined program codes stored in the external memory, each of which respectively corresponds to a radio frequency identification (RFID) protocol, and wherein the external memory is a flash memory and the external memory is a random access memory.

2. The method as claimed in claim 1, wherein the radio frequency identification (RFID) protocol is selected from a group consisting of an ISO 14443A protocol, an ISO 14443B protocol, an ISO 15693 protocol, an ISO 18092 protocol, and an EPC UHF C1G2 protocol.

3. The method as claimed in claim 1, wherein the program code is loaded from the external memory into the internal memory in a direct memory access mode.

4. A mobile communication device, comprising:

an external memory, stored with a target program code corresponding to a target communication protocol; and a micro-processor, coupled to the external memory and provided with an internal memory, for entering a monitoring mode from a non-monitoring mode and performing a monitoring procedure to monitor whether the micro-processor receives a loading request corresponding to the target program code, and loading the target program code into the internal memory in response to the loading request;

wherein the micro-processor is rebooted and exits the monitoring mode to enter into the non-monitoring mode in which the target program code stored in the internal memory is executed after the target program code is loaded into the internal memory;

wherein, after the micro-processor enters the non-monitoring mode, a next reboot is performed to prompt the micro-processor to enter the monitoring mode;

wherein a plurality of predetermined program codes are stored in the external memory, each of which respectively corresponds to a radio frequency identification (RFID) protocol, and wherein the external memory is a flash memory and the external memory is a random access memory.

5. The method as claimed in claim 4, wherein the radio frequency identification (RFID) protocol is selected from a group consisting of an ISO 14443A protocol, an ISO 14443B protocol, an ISO 15693 protocol, an ISO 18092 protocol, and an EPC UHF C1G2 protocol.

6. The communication device as claimed in claim 4, wherein a monitor program code corresponding to the monitoring procedure is executed and is stored in the external memory.

7. The method as claimed in claim 4, wherein the program code is loaded from the external memory into the internal memory in a direct memory access mode.

* * * * *